(12) United States Patent
Lee et al.

(10) Patent No.: US 7,948,475 B2
(45) Date of Patent: May 24, 2011

(54) KEY CONTROL APPARATUS OF A PORTABLE TERMINAL

(75) Inventors: Seng-Tai Lee, Busan (KR); Seok-Hyo Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 11/758,125

(22) Filed: Jun. 5, 2007

(65) Prior Publication Data

US 2008/0117185 A1 May 22, 2008

(30) Foreign Application Priority Data

Nov. 16, 2006 (KR) .................. 10-2006-0113271

(51) Int. Cl.
*G06F 3/02* (2006.01)
*G06F 3/041* (2006.01)
*G06F 3/033* (2006.01)
*H05K 5/00* (2006.01)

(52) U.S. Cl. ... 345/169; 345/173; 345/157; 361/679.08; 361/679.11; 361/679.18; 361/679.27

(58) Field of Classification Search .............. None
See application file for complete search history.

(56) References Cited

U.S. PATENT DOCUMENTS

| | | | |
|---|---|---|---|
| 6,204,839 B1 * | 3/2001 | Mato, Jr. ..................... 345/168 |
| D488,453 S * | 4/2004 | Chang et al. ........... D14/138 AB |
| 6,803,903 B1 * | 10/2004 | Osterg.ang.rd et al. ....... 345/168 |
| 7,551,945 B2 * | 6/2009 | Okada et al. ................ 455/566 |
| 2002/0137550 A1 * | 9/2002 | Graham et al. ............. 455/566 |
| 2004/0142734 A1 * | 7/2004 | Kim ......................... 455/575.1 |
| 2004/0150630 A1 | 8/2004 | Hinckley et al. |
| 2004/0179330 A1 * | 9/2004 | Lee et al. ..................... 361/679 |
| 2005/0078464 A1 * | 4/2005 | Hickey ......................... 361/790 |
| 2005/0195971 A1 * | 9/2005 | Turcanu .................. 379/433.07 |
| 2005/0246652 A1 | 11/2005 | Morris |
| 2006/0028454 A1 | 2/2006 | Branton et al. |
| 2006/0063570 A1 * | 3/2006 | Nishimura ................. 455/575.3 |
| 2006/0121766 A1 * | 6/2006 | Kim ............................. 439/332 |
| 2006/0270444 A1 * | 11/2006 | Miramontes ............... 455/550.1 |
| 2007/0205993 A1 * | 9/2007 | Gloyd et al. ................... 345/169 |
| 2008/0042978 A1 * | 2/2008 | Perez-Noguera ............ 345/168 |
| 2008/0132286 A1 * | 6/2008 | Sohn et al. ..................... 455/566 |
| 2008/0212272 A1 * | 9/2008 | Hollander ..................... 361/681 |

FOREIGN PATENT DOCUMENTS

| | | |
|---|---|---|
| EP | 1 617 630 A1 | 1/2006 |
| EP | 1 675 358 A1 | 6/2006 |
| KR | 10-2005-0088149 A | 9/2005 |
| WO | 2005/083990 A1 | 9/2005 |
| WO | 2006/030002 A1 | 3/2006 |

* cited by examiner

*Primary Examiner* — Bipin Shalwala
*Assistant Examiner* — Daniel Bedell
(74) *Attorney, Agent, or Firm* — Jefferson IP Law, LLP

(57) ABSTRACT

A key control apparatus for a portable terminal including a first housing with first and second display units and a second housing with first and second key input units is provided. The key control apparatus includes a first key input unit, a second key input unit and a control unit. The first key input unit includes a plurality of touch-sensitive touch keys for implementing given functions, one or more mechanical keys, and a plurality of sensors for sensing the touching of the touch keys and implementing a scroll function. The second key input unit includes a plurality of mechanical keys for implementing given functions or functions corresponding to the keys arranged on the first key input unit. The control unit controls the apparatus so that when a touch key in the first key input unit is touched, a function given to the touch key is implemented.

20 Claims, 4 Drawing Sheets

KEY CONTROL APPARATUS OF A PORTABLE TERMINAL

PRIORITY

This application claims the benefit under 35 U.S.C. §119(a) of a Korean patent application filed in the Korean Industrial Property Office on Nov. 16, 2006 and assigned Serial No. 2006-113271, the entire disclosure of which is hereby incorporated by reference.

BACKGROUND OF THE INVENTION

1. Field of the Invention

The present invention relates to a key control apparatus of a portable terminal. In particular, the present invention relates to a key control apparatus of a portable terminal which allows various functions of the portable terminal to be conveniently implemented.

2. Description of the Related Art

Recently, various convenient functions have been provided for portable terminals. Examples of these functions include an MP3 function, a game function, a Digital Multimedia Broadcasting (DMB) function and the like.

To implement these various functions in a portable terminal, a key input unit which is convenient and simple to manipulate is required.

However, a conventional portable terminal has a key input unit that only has up, down, left and right buttons. This type of conventional key input limits the ability to implement the above-mentioned functions.

SUMMARY OF THE INVENTION

An aspect of the present invention is to address at least the above-mentioned problems and/or disadvantages and to provide at least the advantages described below. Accordingly, an aspect of the present invention is to provide a key control apparatus of a portable terminal which allows various functions of such a portable terminal to be conveniently implemented.

In accordance with an aspect of the present invention, a key control apparatus for a portable terminal including a first housing with first and second display units, and a second housing with first and second key input units is provided. The key control apparatus includes a first key input unit, a second key input, and a control unit. The first key input unit includes a plurality of touch-sensitive touch keys to implement given functions, respectively, one or more mechanical keys, and a plurality of sensors to sense the touching of the touch keys and to implement a scroll function. The second key input unit includes a plurality of mechanical keys to implement given functions or functions corresponding to the keys arranged on the first key input unit. The control unit performs control in such a manner that when a touch key in the first key input unit is touched, a function given to the touch key is implemented, wherein if touching is sensed through a sensor among the sensors of the first key input unit within a predetermined length of time after touching is sensed through another sensor, the control unit performs control in such a manner that a scroll function is performed in a corresponding direction, and when the second housing is rotated, the control unit performs control in such a manner that predetermined keys among the mechanical keys of the second key input unit implement the functions corresponding to the touch keys.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
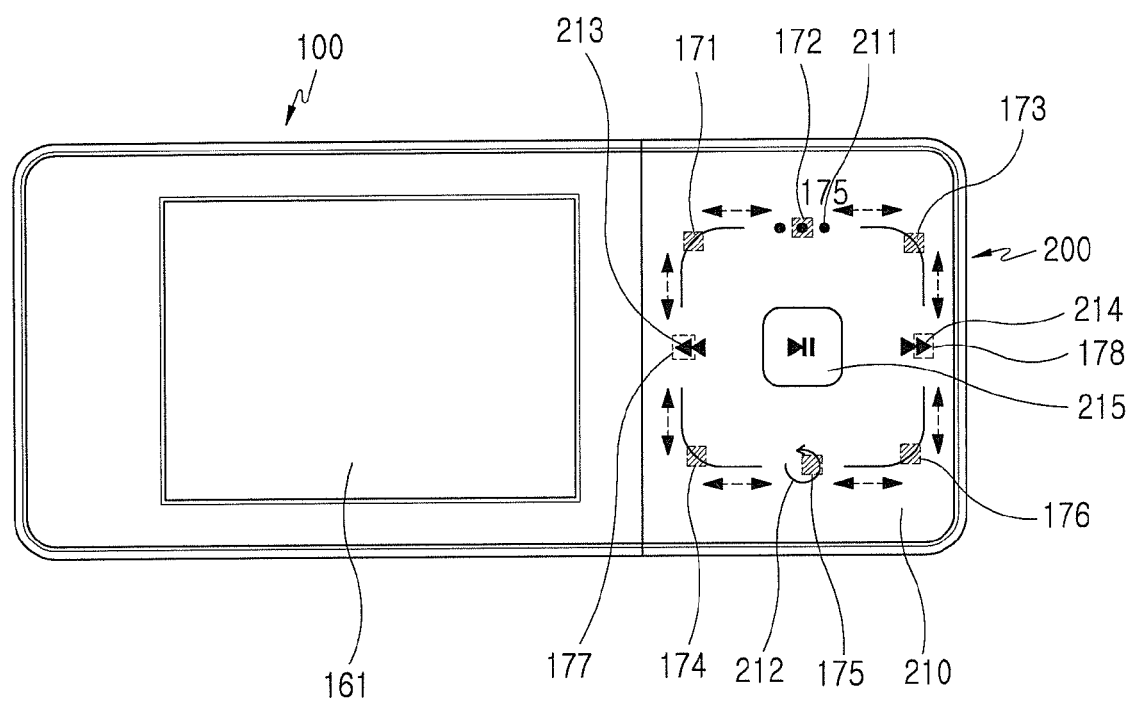
FIG. 1A illustrates a first display unit provided on the front face of a first housing and a first key input unit provided on the front face of a second housing of a portable terminal in accordance with an exemplary embodiment of the present invention.
Figure 1B:
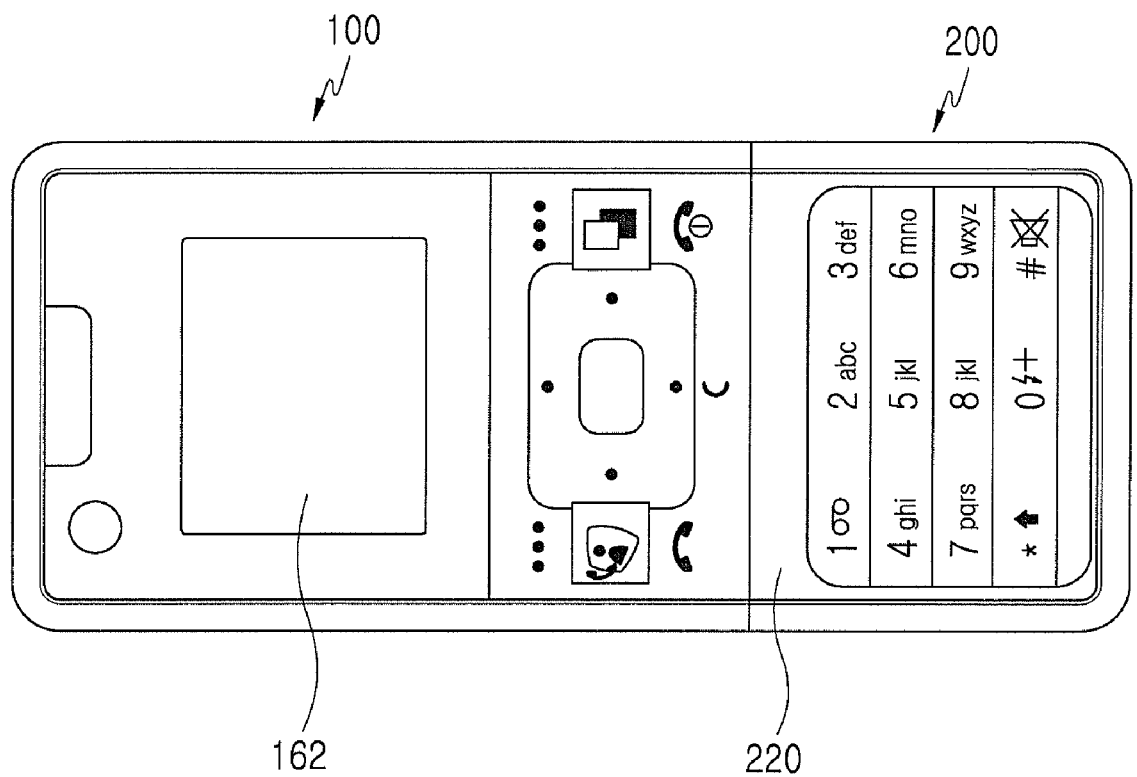
FIG. 1B illustrates a second display unit provided on the rear face of the first housing and a second key input unit provided on the rear face of the second housing of the portable terminal illustrated in FIG. 1A.
Figure 1C:
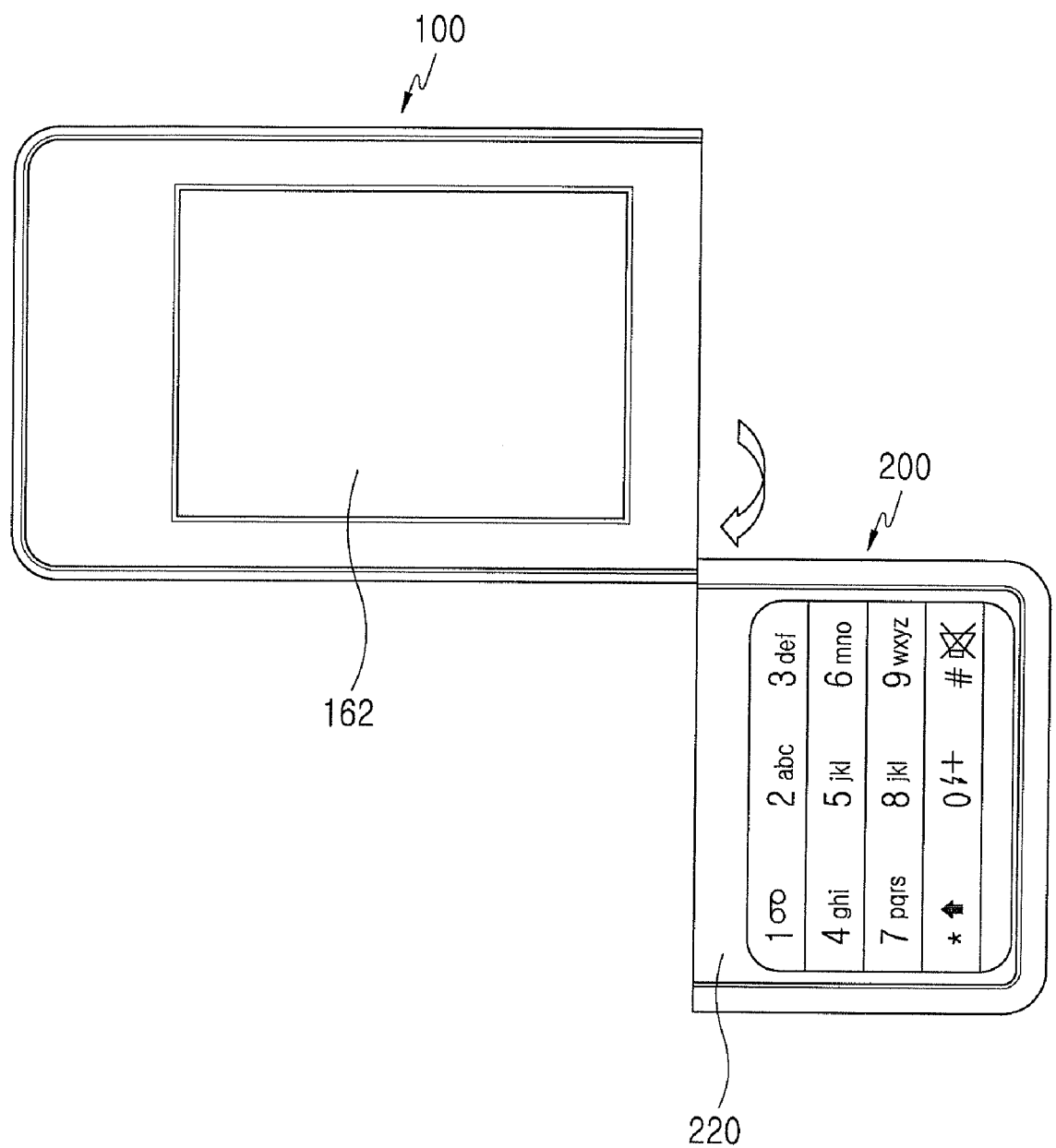
FIG. 1C illustrates the first display provided on the front face of the first housing and the second key input unit provided on the rear face of the second housing of the portable terminal illustrated in FIG. 1A, wherein the second key input unit is shown in the drawing because the second housing is rotated from the state shown in FIG. 1A.
Figure 2:
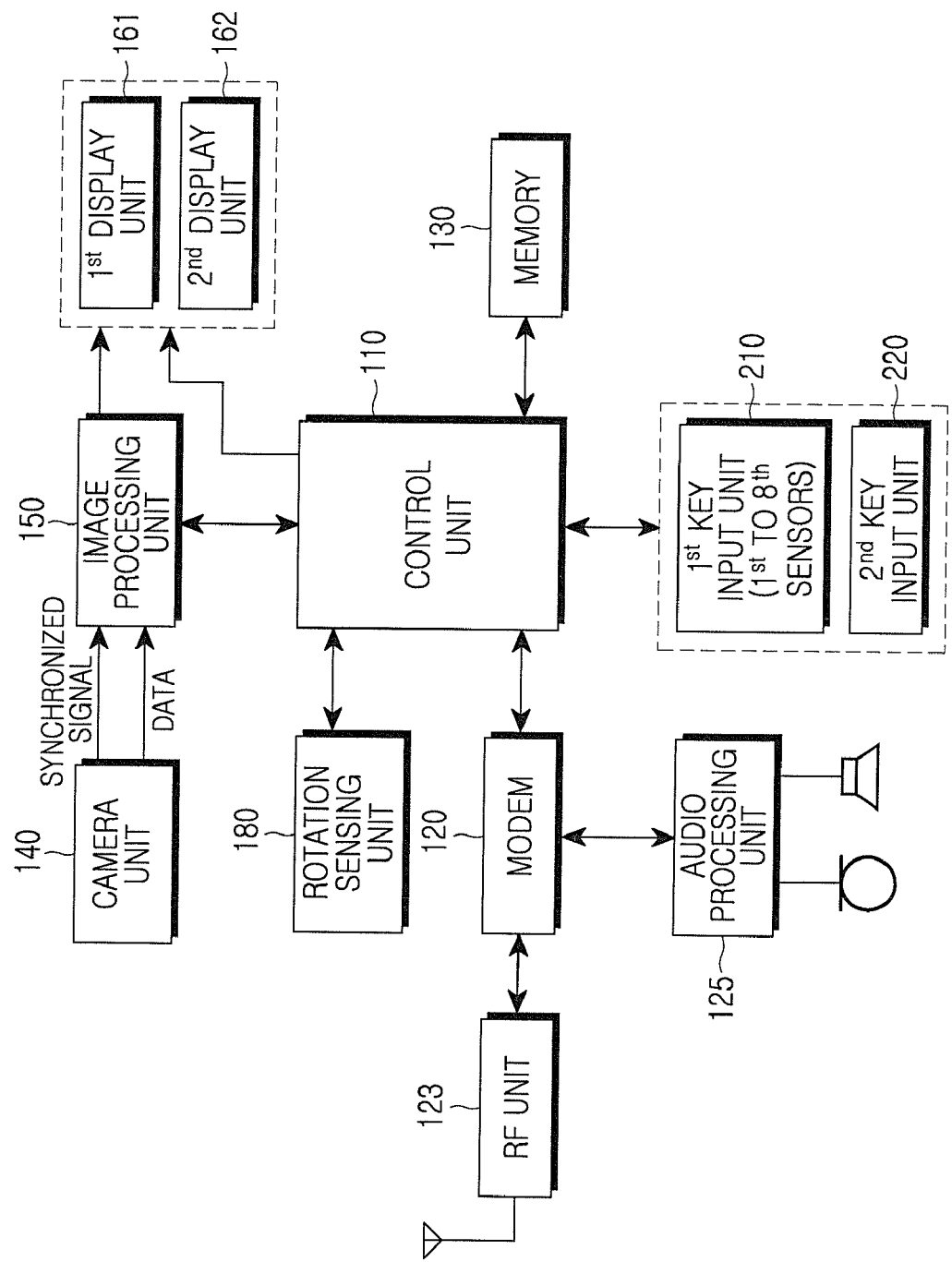
FIG. 2 is a block diagram of the portable terminal shown in FIGS. 1A to 1C.

FIG. 1A illustrates a first display unit provided on the front face of a first housing and a first key input unit provided on the front face of a second housing in a portable terminal in accordance with an exemplary embodiment of the present invention. FIG. 1B illustrates a second display unit provided on the rear face of the first housing and a second key input unit provided on the rear face of the second housing in the portable terminal illustrated in FIG. 1A. FIG. 1C illustrates the first display provided on the front face of the first housing and the second key input unit provided on the rear face of the second housing in the portable terminal illustrated in FIG. 1A, wherein the second key input unit is shown in the drawing because the second housing is rotated from the state shown in FIG. 1A. FIG. 2 is a block diagram of the portable terminal shown in FIGS. 1A to 1C.

Referring to FIGS. 1A to 1C, a portable terminal includes a first housing 100 with first and second display units 161 and 162, and a second housing 200 with first and second key input units 210 and 220.

The first display unit 161 is provided on the front face of the first housing 100, as shown in FIG. 1A, and the second display unit 162 and various function keys are provided on the rear face of the first housing 100, as shown in FIG. 1B.

In addition, the first key input unit 210 is provided on the front face of the second housing 200 as shown in FIG. 1A, and the second key input unit 220 is provided on the rear face of the second housing 200, as shown in FIG. 1B. As shown in FIG. 1C, the second housing 200 is rotatable relative to the first housing 100.

As shown in FIG. 1A, the first key input unit 210 provided on the front face of the second housing 200 includes a plurality of touch-sensitive touch keys, a plurality of sensors for sensing the touching of the touch keys so as to implement scroll functions, and one or more conventional mechanical keys. In the illustrated exemplary embodiment, a key input unit 210 including four (up, down, left and right) touch-sensitive touch keys 211 through 214, eight sensors 171 through 178, and one conventional mechanical key 215 is described by way of an example.

The first key input unit 210 implements a left/right scroll function through a first sensor 171, a second sensor 172, and a third sensor 173, which are sequentially arranged in this order from left to right on the upper area of the key input unit 210, and through a fourth sensor 174, a fifth sensor 175, and a sixth sensor 176, which are sequentially arranged in this order from left to right on the lower area of the key input unit 210.

In addition, the first key input unit 210 implements an up/down scroll function through the first sensor 171, a seventh sensor 177, and the fourth sensor 174, which are sequentially arranged in this order from top to bottom on the left area of the key input unit 210, and through the third sensor 173, an eighth sensor 178, and the sixth sensor 176, which are sequentially arranged in this order from top to bottom on the right area of the key input unit 210.

Furthermore, the first key input unit 210 includes four touch-sensitive touch keys 211 through 214 arranged on the top, bottom, left and right areas of the key input unit 210, and one conventional mechanical key 215 arranged at the center of the touch keys 211 through 214. Touching of the top touch key 211, the bottom touch key 212, the left touch key 213, and the right touch key 214 is sensed by the second sensor 172, the fifth sensor 175, the seventh sensor 177, and the eighth sensor 178, respectively.

As shown in FIG. 1B, the second input unit arranged on the rear face of the second housing 200 includes a plurality of conventional mechanical keys for inputting characters/numerals. When positioned in the condition as shown in FIG. 1B, the second key input unit 200 implements the original functions such as the character/numeral input function, and when positioned in the rotated condition as shown in FIG. 1C, predetermined keys of the second key input unit 220 implement the functions corresponding to the four touch keys 211 through 214 and the one conventional key 215 arranged on the first key input unit 210.

FIG. 2 is a block diagram of the portable terminal as shown in FIGS. 1A to 1C.

Referring to FIGS. 1 and 2, an RF unit 123 implements a wireless communication function of the portable terminal. The RF unit 123 includes an RF transmitter for up-converting and amplifying the frequencies of transmitted signals and an RF receiver for low-noise-amplifying received signals and down-converting the frequencies of the received signals. A modem 120 includes a transmitter for encoding and modulating the transmitted signals and a receiver for decoding and demodulating the received signals. An audio processing unit 125 may use a codec. The codec may include a data codec for processing packet data or the like and an audio codec for processing audio signals. The audio processing unit 125 converts digital audio signals received from the modem 120 into analog signals through the audio codec, thereby reproducing the analog signals, or converts analog audio signals produced and transmitted from a microphone into digital audio signals, thereby transmitting the digital audio signals to the modem 120. The codec may be separately provided or included in a control unit 110.

A memory 130 may include a program memory and a data memory. The program memory may store programs for controlling general operations of the portable terminal, programs for allowing the input and scroll functions of the four touch keys 211 through 214 to be implemented through the eight sensors provided in the second key input unit 210, and programs for controlling predetermined keys of the mechanical keys in the second key input unit to implement the functions corresponding to the keys arranged in the first key input unit according to the rotation of the second housing. In addition, the data memory temporarily stores data produced while the above-mentioned programs are implemented.

A control unit 110 controls all of the functions of the portable terminal. In addition, the control unit 110 may include the modem 120 and the codec.

According to the present exemplary embodiment, with the second key input unit 210 provided on the front face of the second housing 200, which is positioned to correspond to the first display unit 161 provided on the front face of the first housing as shown in FIG. 1A, when a sensing signal is outputted from the second sensor 172, the control unit 110 performs control in such a manner that the input of the top touch key 211 is sensed, and the corresponding function is implemented, and when a sensing signal is outputted from the eighth sensor 178, the control unit 110 performs control in such a manner that the input of the right touch key 214 is sensed, and the corresponding function is implemented.

In addition, according to the present exemplary embodiment, the control unit 110 performs control in such a manner that the right/left scroll function and the up/down scroll function are implemented through the signals outputted from the first to eighth sensors 171 through 178.

If a signal is outputted from the second sensor 172 within a predetermined length of time after a signal is outputted from the first sensor 171, the control unit 110 performs control in such a manner that a first left-to-right scroll function for moving one step from left to right is implemented, and if a signal is outputted from the third sensor 173 within a predetermined length of time after a signal is outputted from the second sensor 172, the control unit 110 performs control in such a manner that a second left-to-right scroll function for moving further one step from left to right, with reference to the position moved one step through the first left-to-right scroll function, is implemented.

In addition, if a signal is outputted from the third sensor 173 within a predetermined length of time after a signal is outputted from the first sensor 171, the control unit 110 performs control in such a manner that a third left-to-right scroll function for directly moving two steps from left to right is implemented without implementing an intermediate step.

If a signal is outputted from the second sensor 172 within a predetermined length of time after a signal is outputted from the third sensor 173, the control unit 110 performs control in such a manner that a first right-to-left scroll function for moving one step from right to left is implemented, and if a signal is outputted from the first sensor 171 within a predetermined length of time after a signal is outputted from the second sensor 172, the control unit 110 performs control in such a manner that a second right-to-left scroll function for moving further one step from right to left, with reference to the position moved one step through the first left-to-right scroll function, is implemented.

In addition, if a signal is outputted from the first sensor 171 within a predetermined length of time after a signal is outputted from the third sensor 173, the control unit 110 performs control in such a manner that a third right-to-left scroll function for directly moving two steps from right to left is implemented without implementing an intermediate step.

If a signal is outputted from the fifth sensor 175 within a predetermined length of time after a signal is outputted from the fourth sensor 174, the control unit 110 performs control in such a manner that the first left-to-right scroll function for moving one step from left to right is implemented, and if a signal is outputted from the sixth sensor 176 within a predetermined length of time after a signal is outputted from the fifth sensor 175, the control unit 110 performs control in such a manner that the second left-to-right scroll function for moving further one step from left to right, with reference to the position moved one step through the first left-to-right scroll function, is implemented.

In addition, if a signal is outputted from the sixth sensor 176 within a predetermined length of time after a signal is outputted from the fourth sensor 174, the control unit 110 performs control in such a manner that the third left-to-right scroll function for directly moving two steps from left to right is implemented without implementing an intermediate step.

If a signal is outputted from the fifth sensor 175 within a predetermined length of time after a signal is outputted from the sixth sensor 176, the control unit 110 performs control in such a manner that the first right-to-left scroll function for moving one step from right to left is implemented, and if a signal is outputted from the fourth sensor 174 within a predetermined length of time after a signal is outputted from the fifth sensor 175, the control unit 110 performs control in such a manner that the second right-to-left scroll function for moving further one step from right to left, with reference to the position moved one step through the first left-to-right scroll function, is implemented.

In addition, if a signal is outputted from the fourth sensor 174 within a predetermined length of time after a signal is outputted from the sixth sensor 176, the control unit 110 performs control in such a manner that the third right-to-left scroll function for directly moving two steps from right to left is implemented without implementing an intermediate step.

If a signal is outputted from the seventh sensor 177 within a predetermined length of time after a signal is outputted from the first sensor 171, the control unit 110 performs control in such a manner that a first up-to-down scroll function for moving one step from up to down is implemented, and if a signal is outputted from the fourth sensor 174 within a predetermined length of time after a signal is outputted from the seventh sensor 177, the control unit 110 performs control in such a manner that a second up-to-down scroll function for moving further one step from up to down, with reference to the position moved one step from up to down through the first up-to-down scroll function, is implemented.

In addition, if a signal is outputted from the fourth sensor 174 within a predetermined length of time after a signal is outputted from the first sensor 171, the control unit 110 performs control in such a manner that a third up-to-down scroll function for directly moving two steps from up to down is implemented without implementing an intermediate step.

If a signal is outputted from the seventh sensor 177 within a predetermined length of time after a signal is outputted from the fourth sensor 174, the control unit 110 performs control in such a manner that a first down-to-up scroll function for moving one step from bottom to top is implemented, and if a signal is outputted from the first sensor 171 within a predetermined length of time after a signal is outputted from the seventh sensor 177, the control unit 110 performs control in such a manner that a second down-to-up scroll function for moving further one step from bottom to top, with reference to the position moved one step from bottom to top through the first down-to-up scroll function, is implemented.

In addition, if a signal is outputted from the first sensor 171 within a predetermined length of time after a signal is outputted from the fourth sensor 174, the control unit 110 performs control in such a manner that a third down-to-up scroll function for directly moving two steps from bottom to top is implemented without implementing an intermediate step.

If a signal is outputted from the eighth sensor 178 within a predetermined length of time after a signal is outputted from the third sensor 173, the control unit 110 performs control in such a manner that the first up-to-down scroll function for moving one step from up to down is implemented, and if a signal is outputted from the sixth sensor 176 within a predetermined length of time after a signal is outputted from the eighth sensor 178, the control unit 110 performs control in such a manner that the second up-to-down scroll function for moving further one step from up to down, with reference to the position moved one step from up to down through the first down-to-up scroll function, is implemented.

In addition, if a signal is outputted from the sixth sensor 176 within a predetermined length of time after a signal is outputted from the third sensor 173, the control unit 110 performs control in such a manner that the third up-to-down scroll function for directly moving two steps from up to down is implemented without implementing an intermediate step.

If a signal is outputted from the eighth sensor 178 within a predetermined length of time after a signal is outputted from the sixth sensor 176, the control unit 110 performs control in such a manner that the first down-to-up scroll function for moving one step from bottom to top is implemented, and if a signal is outputted from the third sensor 173 within a predetermined length of time after a signal is outputted from the eighth sensor 178, the control unit 110 performs control in such a manner that the second down-to-up scroll function for moving further one step from bottom to top, with reference to the position moved one step from bottom to top through the first down-to-up scroll function, is implemented.

In addition, if a signal is outputted from the third sensor 173 within a predetermined length of time after a signal is outputted from the sixth sensor 176, the control unit 110 performs control in such a manner that the third down-to-up scroll function for directly moving two steps from bottom to top is implemented without implementing an intermediate step.

According to the present exemplary embodiment, the control unit 110 senses the rotation of the second housing 200 according to a rotation sensing signal outputted from a rotation sensing unit 180. If the control unit 110 senses that the second housing 200 positioned as shown in FIG. 1A is rotated and positioned as shown in FIG. 1C according to the rotation sensing signal of the rotation sensing unit 180, the control unit 110 performs control in such a manner that the predetermined keys arranged in the second key input unit 220 implement functions corresponding to the keys arranged in the first key input unit 210. For example, the control unit 110 controls in such manner that the No. 6 key, the No. 4 key, the No. 2 key, and the No. 8 key among the keys arranged in the second key input unit 220 implement functions corresponding to the touch keys 211 through 214 arranged at the top, bottom, left and right areas of the first key input unit 210, and also performs control in such a manner that the No. 5 key arranged in the second key input unit 220 implements a function corresponding to the conventional key centrally arranged on the first key input unit 210.

A camera unit 140 includes a camera sensor for capturing image data and converting the optical signals of the captured image data into electric signals, and a signal processing unit for converting the analog image data captured by the camera sensor into digital data. Here, assuming that the camera sensor is a charge coupled device (CCD) sensor, the signal processing unit may be implemented by a Digital Signal Processor (DSP). In addition, the camera sensor and the signal processing unit may be either integrally or separately implemented.

An image processing unit 150 produces screen data for displaying image signals outputted from the camera unit 140. The image processing unit 150 processes the image signals outputted from the camera unit 140 in frames, and outputs the frame image data in such a manner that the frame image data matches the characteristic and size of a corresponding display unit. In addition, the image processing unit 150 includes an image codec, and compresses the frame image data displayed on the display unit by a preset method or restores the compressed frame image data to the original frame image data. Here, the image codec may be a JPEG codec, an MPEG4 codec, a Wavelet codec, or the like. Assuming that the image processing unit 150 has an On Screen Display (OSD) function, on-screen display data can be outputted according to the size of a screen displayed under the control of the control unit 110.

The display units include a first display unit 161 provided on the front face of the first housing 100 and a second display unit 162 provided on the rear face of the first housing. The display units 161 and 162 display the image signals outputted from the image processing unit 150 as a screen and display the user data outputted from the control unit 110. The display units 160 may employ liquid crystal displays (LCDs). In such a case, the display units 161 and 162 may include an LCD controller, a memory capable of storing image data, and an LCD display device.

According to an exemplary embodiment of the present invention, the first display unit 161 may display corresponding functions which can be implemented through the touching of the four touch keys 211 through 214, the inputting of the one conventional key 215, and the scroll functions, wherein the touch keys and the conventional key are arranged on the first key input unit 210. In addition, when the second housing 200 is rotated according to an exemplary embodiment of the present invention, the first display unit 161 may display various functions implemented through the inputting of the predetermined keys arranged on the second key input unit 220, wherein the predetermined keys perform the functions corresponding to the keys arranged on the first key input unit 210.

As described above, the first key input unit 210 is provided on the front face of the second housing 200, and the second key input unit 220 is provided on the rear face of the second housing 200.

The first key input unit 210 includes four touch-sensitive touch keys 211 through 214, one conventional mechanical key 215, and eight sensors 171 through 178 for sensing the touching of the touch keys so as to implement scroll functions, as shown in FIG. 1A.

The second key input unit 220 includes a plurality of conventional mechanical keys as shown in FIG. 1B, wherein the keys implements corresponding keys, respectively. If the second housing is rotated as shown in FIG. 1C, predetermined keys among the keys arranged in the second key input unit 220 implement the same functions as the keys arranged on the first key input unit.

The rotation sensing unit 180 senses the rotation of the second housing and outputs the sensed result to the control unit 110. The rotation sensing unit 180 may be a magnet and a Hall effect sensor.

A description will now be made of how corresponding functions are implemented in the above-mentioned portable terminal through the first and second key input units. In a state in which the first display unit 161 provided on the front face of the first housing 100 and the first key input unit 200 provided on the front face of the second housing 200 are positioned as shown in FIG. 1A, if the top touch key 211 is touched and the second sensor 172 senses it and outputs the sensed result to the control unit 110, the control unit 110 controls the top touch key 211 to implement the given function. In addition, if the bottom touch key 212 is touched, the fifth sensor 175 senses it and outputs the sensed result to the control unit 110, and the control unit 110 controls the bottom touch key 212 to implement the given function. Further, if the left touch key 213 is touched and the seventh sensor 177 senses it and outputs the sensed result to the control unit 110, the control unit 110 controls the left touch key 213 to implement the given function. If the right touch key 214 is touched and the eighth sensor 178 senses it and outputs the sensed result to the control unit 110, the control unit 110 controls the right touch key 214 to implement the given function.

If a signal is outputted from the second sensor 172 within a predetermined length of time after a signal is outputted from the first sensor 171, the control unit 110 senses it and performs control in such a manner that a first left-to-right scroll function for moving one step from left to right is implemented. If a signal is outputted from the third sensor 173 within a predetermined length of time after a signal is outputted from the second sensor 172, the control unit 110 performs control in such a manner that a second left-to-right scroll function for moving further one step from left to right is implemented after the first left-to-right scroll function is implemented.

In addition, if a signal is outputted from the third sensor 173 within a predetermined length of time after a signal is outputted from the first sensor 171, the control unit 110 performs control in such a manner that a third left-to-right scroll function for directly moving two steps from left to right is implemented without implementing an intermediate step.

If a signal is outputted from the second sensor 172 within a predetermined length of time after a signal is outputted from the third sensor 173, the control unit 110 senses it and performs control in such a manner that a first right-to-left scroll function for moving one step from right to left is implemented. If a signal is outputted from the first sensor 171 within a predetermined length of time after a signal is outputted from the second sensor 172, the control unit 110 performs control in such a manner that a second right-to-left scroll function for moving further one step from right to left is implemented after the first right-to-left scroll function is implemented.

In addition, if a signal is outputted from the first sensor 171 within a predetermined length of time after a signal is outputted from the third sensor 173, the control unit 110 performs control in such a manner that a third right-to-left scroll function for directly moving two steps from right to left is implemented without implementing an intermediate step.

If a signal is outputted from the fifth sensor 175 within a predetermined length of time after a signal is outputted from the fourth sensor 174, the control unit 110 senses it and performs control in such a manner that the first left-to-right scroll function for moving one step from left to right is implemented. If a signal is outputted from the sixth sensor 176 within a predetermined length of time after a signal is outputted from the fifth sensor 175, the control unit 110 performs control in such a manner that the second left-to-right scroll function for moving further one step from left to right is implemented after the first left-to-right scroll function is implemented.

In addition, if a signal is outputted from the sixth sensor 176 within a predetermined length of time after a signal is outputted from the fourth sensor 174, the control unit 110 performs control in such a manner that the third left-to-right scroll function for directly moving two steps from left to right is implemented without implementing an intermediate step.

If a signal is outputted from the fifth sensor 175 within a predetermined length of time after a signal is outputted from the sixth sensor 176, the control unit 110 senses it and performs control in such a manner that the first right-to-left scroll function for moving one step from right to left is implemented. If a signal is outputted from the fourth sensor 174 within a predetermined length of time after a signal is outputted from the fifth sensor 175, the control unit 110 performs control in such a manner that the second right-to-left scroll function for moving further one step from right to left is implemented after the first right-to-left scroll function is implemented.

In addition, if a signal is outputted from the fourth sensor 174 within a predetermined length of time after a signal is outputted from the sixth sensor 176, the control unit 110 performs control in such a manner that the third right-to-left scroll function for directly moving two steps from right to left is implemented without implementing an intermediate step.

If a signal is outputted from the seventh sensor 177 within a predetermined length of time after a signal is outputted from the first sensor 171, the control unit 110 senses it and performs control in such a manner that a first up-to-down scroll function for moving one step from up to down is implemented. If a signal is outputted from the fourth sensor 174 within a predetermined length of time after a signal is outputted from the seventh sensor 177, the control unit 110 performs control in such a manner that a second up-to-down scroll function for moving further one step from up to down is implemented after the first up-to-down scroll function is implemented.

In addition, if a signal is outputted from the fourth sensor 174 within a predetermined length of time after a signal is outputted from the seventh sensor 177, the control unit 110 performs control in such a manner that a third up-to-down scroll function for directly moving two steps from up to down is implemented without implementing an intermediate step.

If a signal is outputted from the seventh sensor 177 within a predetermined length of time after a signal is outputted from the fourth sensor 174, the control unit 110 senses it and performs control in such a manner that a first down-to-up scroll function for moving one step from down to up is implemented. If a signal is outputted from the first sensor 171 within a predetermined length of time after a signal is outputted from the seventh sensor 177, the control unit 110 performs control in such a manner that a second down-to-up scroll function for moving further one step from down to up is implemented after the first down-to-up scroll function is implemented.

In addition, if a signal is outputted from the first sensor 171 within a predetermined length of time after a signal is outputted from the fourth sensor 174, the control unit 110 performs control in such a manner that a third down-to-up scroll function for directly moving two steps from down to up is implemented without implementing an intermediate step.

If a signal is outputted from the eighth sensor 178 within a predetermined length of time after a signal is outputted from the third sensor 173, the control unit 110 senses it and performs control in such a manner that the first up-to-down scroll function for moving one step from up to down is implemented. If a signal is outputted from the sixth sensor 176 within a predetermined length of time after a signal is outputted from the eighth sensor 178, the control unit 110 performs control in such a manner that the second up-to-down scroll function for moving further one step from up to down is implemented after the first up-to-down scroll function is implemented.

In addition, if a signal is outputted from the sixth sensor 176 within a predetermined length of time after a signal is outputted from the third sensor 173, the control unit 110 performs control in such a manner that the third up-to-down scroll function for directly moving two steps from up to down is implemented without implementing an intermediate step.

If a signal is outputted from the eighth sensor 178 within a predetermined length of time after a signal is outputted from the sixth sensor 176, the control unit 110 senses it and performs control in such a manner that the first down-to-up scroll function for moving one step from down to up is implemented. If a signal is outputted from the third sensor 173 within a predetermined length of time after a signal is outputted from the eighth sensor 178, the control unit 110 performs control in such a manner that the second down-to-up scroll function for moving further one step from down to up is implemented after the first down-to-up scroll function is implemented.

In addition, if a signal is outputted from the third sensor 173 within a predetermined length of time after a signal is outputted from the sixth sensor 176, the control unit 110 performs control in such a manner that the third down-to-up scroll function for directly moving two steps from down to up is implemented without implementing an intermediate step.

Through the above-mentioned left/right scroll function, a screen movement or menu selection function can be implemented in a portable terminal. In addition, through the above-mentioned up/down scroll function, a volume control function, a light control function in a photographic mode, a menu selection function or the like can be implemented.

In addition, if a signal notifying that the second housing 200 has been rotated from the position of FIG. 1A to the position of FIG. 1C is outputted from the rotation sensing unit 180, the control unit 110 senses it and performs control in such a manner that predetermined keys among the conventional keys arranged on the second key input unit 220 perform the functions corresponding to the keys arranged on the first key input unit 210.

As described above, it is possible to maximize the convenience of an interface by providing touch-sensitive touch keys and conventional mechanical keys on two key input units of a portable terminal according to the exemplary embodiment of the present invention as described above. In addition, it is convenient to implement associated functions in a portable terminal by implementing scroll functions through a plurality of sensors provided on key input units. Furthermore, by switching the touch keys and the conventional keys, it is possible to implement the functions of the touch keys as well as to improve tactile feedback when the conventional keys are used.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A key control apparatus for a portable terminal comprising a first housing with first and second display units and a second housing with first and second key input units, the key control apparatus comprising:
   the first key input unit comprising a plurality of touch-sensitive touch keys for implementing given functions, one or more mechanical keys, and a plurality of sensors for sensing the touching of the touch keys and implementing a scroll function;
   the second key input unit comprising a plurality of mechanical keys that are not touch-sensitive for implementing given functions and functions corresponding to the keys arranged on the first key input unit; and
   a control unit performing control in such a manner that when a touch key in the first key input unit is touched, a function given to the touch key is implemented, wherein if touching is sensed through a sensor among the sensors of the first key input unit within a predetermined length of time after touching is sensed through another sensor, the control unit performs control in such a manner that a scroll function is performed in a corresponding direction, and when the second housing is rotated, the control unit performs control in such a manner that predetermined keys among the mechanical keys of the second key input unit implement the functions corresponding to the touch keys, including the given functions and the scroll function.

2. A key control apparatus as claimed in claim 1, wherein the keys of the first key input unit comprise first to eighth sensors,
   wherein a left/right scroll function is implemented through the first, second and third sensors sequentially arranged from left to right on an upper area of the first key input unit, and through the fourth, fifth and sixth sensors sequentially arranged from left to right on a lower area of the first key input unit, and
   wherein an up/down scroll function is implemented through the first, seventh and fourth sensors sequentially arranged from up to down on a left area of the first key input unit, and through the third, eighth and sixth sensors sequentially arranged from up to down on a right area of the first key input unit.

3. A key control apparatus as claimed in claim 2, wherein the control unit implements the left/right scroll function in the following manner:
   if touching is sensed by the second sensor within a predetermined length of time after touching is sensed by the first sensor, a first left-to-right scroll function for moving one step from left to right is implemented, and if touching is sensed by the third sensor within a predetermined length of time after touching is sensed by the second sensor, a second left-to-right scroll function for moving further one step from left to right, with reference to the position moved one step through the first left-to-right scroll function; and
   if touching is sensed by the second sensor within a predetermined length of time after touching is sensed by the third sensor, a first right-to-left scroll function for moving one step from right to left is implemented, and if touching is sensed by the first sensor within a predetermined length of time after touching is sensed by the second sensor, a second right-to-left scroll function for moving further one step from right to left, with reference to the position moved one step through the first right-to-left scroll function.

4. A key control apparatus as claimed in claim 2, wherein the control unit implements the left/right scroll function in the following manner:
   if touching is sensed by the third sensor within a predetermined length of time after touching is sensed by the first sensor, a third left-to-tight scroll function for directly moving two steps from left to tight is implemented; and
   if touching is sensed by the first sensor within a predetermined length of time after touching is sensed by the third sensor, a third tight-to-left scroll function for directly moving two steps from light to left is implemented.

5. A key control apparatus as claimed in claim 2, wherein the control unit implements the left/right scroll function in the following manner:
   if touching is sensed by the fifth sensor within a predetermined length of time after touching is sensed by the fourth sensor, a first left-to-right scroll function for moving one step from left to right is implemented, and if touching is sensed by the sixth sensor within a predetermined length of time after touching is sensed by the fifth sensor, a second left-to-right scroll function for moving further one step from left to right, with reference to the position moved one step through the first left-to-right scroll function; and
   if touching is sensed by the fifth sensor within a predetermined length of time after touching is sensed by the sixth sensor, a first right-to-left scroll function for moving one step from right to left is implemented, and if touching is sensed by the fourth sensor within a predetermined length of time after touching is sensed by the fifth sensor, a second right-to-left scroll function for moving further one step from right to left, with reference to the position moved one step through the first right-to-left scroll function.

6. A key control apparatus as claimed in claim 2, wherein the control unit implements the left/right scroll function in the following manner:
   if touching is sensed by the sixth sensor within a predetermined length of time after touching is sensed by the fourth sensor, a third left-to-right scroll function for directly moving two steps from left to right is implemented; and
   if touching is sensed by the fourth sensor within a predetermined length of time after touching is sensed by the sixth sensor, a third tight-to-left scroll function for directly moving two steps from right to left is implemented.

7. A key control apparatus as claimed in claim 2, wherein the control unit implements the up/down scroll function in the following manner:
   if touching is sensed by the seventh sensor within a predetermined length of time after touching is sensed by the first sensor, a first up-to-down scroll function for moving one step from up to down is implemented, and if touching is sensed by the fourth sensor within a predetermined length of time after touching is sensed by the seventh sensor, a second up-to-down scroll function for moving further one step from up to down, with reference to the position moved one step through the first up-to-down scroll function; and
   if touching is sensed by the seventh sensor within a predetermined length of time after touching is sensed by the fourth sensor, a first down-to-up scroll function for moving one step from down to up is implemented, and if touching is sensed by the first sensor within a predetermined length of time after touching is sensed by the seventh sensor, a second down-to-up scroll function for moving further one step from down to up, with reference to the position moved one step through the first down-to-up scroll function.

8. A key control apparatus as claimed in claim 2, wherein the control unit implements the up/down scroll function in the following manner:
if touching is sensed by the fourth sensor within a predetermined length of time after touching is sensed by the first sensor, a third up-to-down scroll function for directly moving two steps from up to down is implemented; and
if touching is sensed by the first sensor within a predetermined length of time after touching is sensed by the fourth sensor, a third down-to-up scroll function for directly moving two steps from down to up is implemented.

9. A key control apparatus as claimed in claim 2, wherein the control unit implements the up/down scroll function in the following manner:
if touching is sensed by the eighth sensor within a predetermined length of time after touching is sensed by the third sensor, a first up-to-down scroll function for moving one step from up to down is implemented, and if touching is sensed by the sixth sensor within a predetermined length of time after touching is sensed by the eighth sensor, a second up-to-down scroll function for moving further one step from up to down, with reference to the position moved one step through the first up-to-down scroll function; and
if touching is sensed by the eighth sensor within a predetermined length of time after touching is sensed by the sixth sensor, a first down-to-up scroll function for moving one step from down to up is implemented, and if touching is sensed by the third sensor within a predetermined length of time after touching is sensed by the eighth sensor, a second down-to-up scroll function for moving further one step from down to up, with reference to the position moved one step through the first down-to-up scroll function.

10. A key control apparatus as claimed in claim 2, wherein the control unit implements the up/down scroll function in the following manner:
if touching is sensed by the sixth sensor within a predetermined length of time after touching is sensed by the third sensor, a third up-to-down scroll function for directly moving two steps from up to down is implemented; and
if touching is sensed by the sixth sensor within a predetermined length of time after touching is sensed by the third sensor, a third down-to-up scroll function for directly moving two steps from down to up is implemented.

11. A key control apparatus as claimed in claim 2, wherein at least one of a screen movement function and a menu selection function is implemented through the right/right scroll function.

12. A key control apparatus as claimed in claim 2, wherein at least one of a volume control function, a light control function in a photographic mode, and a menu selection function is implemented through the up/down scroll function.

13. A key control apparatus as claimed in claim 2, wherein the plurality of touch keys of the first key input unit comprises a top touch key arranged at the top area of the first key input unit, a bottom touch key arranged at the lower area of the first key input unit, a left touch key arranged at the left area of the first key input unit and a right touch key arranged at the right area of the first key input unit, and
wherein the touching of the top touch key is sensed through the second sensor, the touching of the bottom touch key is sensed through the fifth sensor, the touching of the left touch key is sensed through the seventh sensor, and the touching of the right key is sensed through the eighth sensor.

14. A key control apparatus as claimed in claim 1, further comprising a rotation sensing unit for sensing the rotation of the second housing.

15. A portable terminal comprising:
a first housing
a second housing rotatably attached to the first housing, the second housing having an upper surface and a lower surface;
a first key input unit disposed on the upper surface of the second housing, the first key input unit comprising a plurality of touch-sensitive keys and a plurality of sensors;
a second key input unit disposed on the lower surface of the second housing, the second key input unit comprising a plurality of keys; and
a control unit for controlling the portable terminal,
wherein the plurality of sensors on the first key input unit implement a scroll function, and,
when the second housing is rotated, the keys of the second input unit implement the scroll function corresponding to the sensors of the first key input unit.

16. A portable terminal as claimed in claim 15, wherein the plurality of sensors of the first key input unit comprise:
first, second and third sensors sequentially arranged from left to right on an upper area of the first key input unit;
fourth, fifth and sixth sensors sequentially arranged from left to right on a lower area of the first key input unit; and
seventh and eighth sensors sequentially arranged from left to right on a middle area of the first key input unit,
wherein the first, second and third sensors and the fourth, fifth and sixth sensors implement a left/right scrolling function and a right/left scrolling function, and the first, seventh and fourth sensors and the third, eighth and sixth sensors implement an up/down scrolling function and a down/up scrolling function.

17. A portable terminal as claimed in claim 16, wherein the plurality of touch keys of the first key input unit comprises a top touch key arranged at the top area of the first key input unit, a bottom touch key arranged at the lower area of the first key input unit, a left touch key arranged at the left area of the first key input unit and a right touch key arranged at the tight area of the first key input unit, and
wherein the touching of the top touch key is sensed through the second sensor, the touching of the bottom touch key is sensed through the fifth sensor, the touching of the left touch key is sensed through the seventh sensor, and the touching of the right key is sensed through the eighth sensor.

18. A portable terminal as claimed in claim 17, wherein the first key input unit further comprises at least one mechanical key disposed in a central area of the first key input unit.

19. A portable terminal as claimed in claim 15, wherein the keys of the second input unit comprise mechanical keys.

20. A portable terminal as claimed in claim 15, further comprising a rotation sensing unit for sensing the rotation of the second housing.

* * * * *